United States Patent [19]

Ishioka

[11] Patent Number: 4,793,599
[45] Date of Patent: Dec. 27, 1988

[54] ELECTRONICALLY CONTROLLED MOUNTING STRUCTURE FOR MOUNTING POWER UNIT ON VEHICLE

[75] Inventor: Yutaka Ishioka, Nagoya, Japan

[73] Assignee: Tokai Rubber Industries, Ltd., Aichi, Japan

[21] Appl. No.: 56,376

[22] Filed: Jun. 1, 1987

[30] Foreign Application Priority Data

Jun. 6, 1986 [JP] Japan .................. 61-132558

[51] Int. Cl.$^4$ ............................................. F16M 1/00
[52] U.S. Cl. .................................. 267/140.1; 248/562; 248/636; 248/550
[58] Field of Search .................. 267/140.1, 140.2, 35; 188/322.16; 248/636, 562, 563, 652, 566, 550; 180/312, 300

[56] References Cited

FOREIGN PATENT DOCUMENTS

| 3423698 | 1/1985 | Fed. Rep. of Germany ... 267/140.1 |
| 55-107142 | 8/1980 | Japan . |
| 55-107145 | 8/1980 | Japan . |
| 57-8540 | 1/1985 | Japan . |
| 57-9340 | 1/1985 | Japan . |
| 2041488 | 9/1980 | United Kingdom ............. 267/140.1 |

Primary Examiner—Douglas C. Butler
Assistant Examiner—Mark T. Le
Attorney, Agent, or Firm—Parkhurst, Oliff & Berridge

[57] ABSTRACT

A mounting structure disposed between a body and a power unit of a vehicle for mounting of the power unit on the body, so as to effect vibration damping and isolation under the control of a control device, including: an elastic body connected to one of the body and the power unit of the vehicle, and partially defining a pressure-receiving chamber filled with an incompressible fluid; an elastic member partially defining an equilibrium chamber filled with the fluid and communicating with the pressure-receiving chamber, so as to permit a change in a volume of the pressure-receiving chamber; a movable member disposed between the pressure-receiving and equilibrium chambers, and exposed to the pressure-receiving and equilibrium chambers, the movable member being movable over a predetermined maximum distance in opposite directions parallel to a direction in which the mounting structure receives vibrations; an elastic holder for flexibly supporting the movable member such that the movable member is movable in the opposite directions; a guide for guiding the movable member in the opposite directions; and a drive device connected to the control device, for reciprocating the movable member, over a controlled operating stroke and at a controlled frequency.

16 Claims, 4 Drawing Sheets

ELECTRONICALLY CONTROLLED MOUNTING STRUCTURE FOR MOUNTING POWER UNIT ON VEHICLE

BACKGROUND OF THE INVENTION

1. Field of the Invention

The present invention relates generally to a mounting structure for mounting a power unit on the body of a motor vehicle, and more particularly to an electrically controlled mounting structure for the above purpose, capable of providing controlled vibration damping and isolating characteristics, depending upon the conditions of the motor vehicle and the characteristics of input vibrations.

2. Discussion of the Prior Art

In the art of installing a power unit including an engine on the body of a motor vehicle, mounting units are disposed between the power unit and the vehicle body, for example, for isolating or insulating operating vibrations of the engine from the vehicle body, and isolating vibrations of the vehicle body due to bumpy road surfaces, to the engine. Further, such mounting units are used to damp or attenuate the vibrations of the vehicle body and engine, as well as isolating the vibrations from the body and engine, in order to assure improved driving comfort and maneuverability of the vehicle.

Such a power unit mounting structure for a vehicle is usually required to exhibit relatively high vibration damping capability for vibrations having comparatively low frequencies, and relatively high vibration isolating capability for vibrations having comparatively high frequencies. To this end, a fluid-filled mounting structure has been recently proposed as disclosed in Laid-Open Publications Nos. 55-107142 (published in 1980), 55-107145 (published in 1980) and 57-9340 (published in 1982) of Japanese Patent Applications. According to these publications, the fluid-filled mounting structure has an elastic member made of a rubber material, and two fluid chambers which are filled with an incompressible fluid and which commmunicate with each other through an orifice. Further, a movable member (in the form of a plate or diaphragm) is disposed between the two fluid chambers, as a movable partition separating the two chambers for each other, such that the movable member is movable by a predetermined small distance in the direction of input of the vibrations. When the mounting structure receives vibrations of a low frequency, the fluid is forced to flow through the orifice between the two chambers, so that the input vibrations are damped by a restricted flow of the fluid through the orifice. On the other hand, where high-frequency vibrations are applied to the mounting structure, the movable plate is oscillated or reciprocated following the input vibrations acting on the fluid chambers, whereby the pressure pulsations of the fluid within the chambers are absorbed by the oscillating movements of the movable member. Thus, the mounting structure provides excellent vibration-damping characteristics based on a resistance to a flow of the incompressible fluid through the orifice, for the low-frequency vibrations. At the same time, the mounting structure provides improved vibration-isolating characteristics based on oscillating actions of the movable member and the elastic deformation of the elastic member, for the high-frequency vibrations.

However, the vibration damping and isolating characteristics required of such a fluid-filled mounting structure do not always correspond to the frequency range of the vibrations applied, as described above. Stated differently, the required damping and isolating characteristics may be reversed with respect to the frequency of the input vibrations, under some conditions of the vehicle. In this case, the mounting structure exhibiting the consistent spring characteristics corresponding to the frequencies of the input vibrations cannot always be suitably employed for attaining the intended vibration damping and isolating functions.

For example, a mounting structure used for mounting a power unit on a transverse F—F vehicle (front-drive, front-engine vehicle with an engine oriented in the transverse direction of the vehicle) is required to exhibit spring characteristics (dynamic spring constant, and damping coefficient) suitable primarily for damping and isolating engine-idling vibrations, engine-shaking vibrations, vehicle-start vibrations, engine-jerk vibrations, engine-cranking vibrations, and vibrations causing booming noises. The engine-shaking, engine-jerk and engine-cranking vibrations which take place while the vehicle is started or running, will be collectively referred to as "engine shakes". The engine shakes, and the idling vibrations which occur while the vehicle is parked with the engine idling, have almost the same frequency and amplitude, but the mounting structure is required to exhibit entirely opposite spring characteristics, i.e., dynamic spring constant or rate (Kd), and damping coefficient (C), and indicated in Table 1. Consequently, if the mounting structure discussed above is used in the environments involving the engine-idling vibrations, engine shakes, and booming noise vibrations, the mounting structure fails to effectively damp the engine-idling vibrations, though the structure exhibits suitable spring characteristics for the engine shakes and booming noise vibrations.

TABLE 1

| Types of Vibrations | Frequency (Hz) | Amplitude | Desired Kd | Desired C |
| --- | --- | --- | --- | --- |
| Idling Vibrations | 5–30 | High | Low | Low |
| Engine Shakes | 5–30 | High | High | High |
| Booming Noise | 80–200 | Low | Low | Low |

In the meantime, there has been proposed an electrically controlled mounting structure wherein the movable member is positively oscillated by suitable drive means, in the direction in which vibrations are applied to the structure. An example of such an electrically controlled mounting structure is disclosed in Laid-Open Publications No. 60-8540 (published in 1985) of Japanese Patent Application. In this type of mounting structure, the spring characteristics to be exhibited for the same frequency range of vibrations can be changed or reversed by adjusting the conditions in which the movable member is actuated by the drive means.

The electrically controlled mounting structure is adapted to have a high dynamic spring constant by oscillating or reciprocating the movable member in phase with the input vibrations, so that a change in the pressure in the pressure-receiving chamber (one of the two chambers which primarily receives the input vibrations) is amplified, more precisely, so that the fluid pressure is further elevated where the input vibrations act on the pressure-receiving chamber so as to raise the pressure therein, or the fluid pressure is further lowered where the input vibrations act to lower the pressure in that chamber. The mounting structure is given a relatively low dynamic spring constant by oscillating the movable member such that the oscillation phase is opposite to the phase of the input vibrations, so that a change in the pressure in the pressure-receiving chamber (one of the two chambers which primarily receives the input vibrations) is reduced, namely, so that the fluid pressure is lowered where the input vibrations act on the pressure-receiving chamber so as to raise the pressure therein, or the fluid pressure is elevated where the input vibrations act to lower the pressure in that chamber.

Further, the damping coefficient of the mounting structure is increased by advancing the oscillation phase of the movable member by 90 degrees relative to the phase of the input vibrations, and is decreased by retarding the oscillation phase of the movable member by 90 degrees relative to the vibration phase.

Described in other words, the electrically controlled mounting structure equipped with the built-in drive means for reciprocating the movable member can be readily controlled so as to provide the different or opposite spring characteristics, i.e., high dynamic spring constant and damping coefficinet, and low dynamic spring constant and damping coefficient, by oscillating the movable member with an advanced phase of 0-90 degrees or a retarded phase of 90-180 degrees, relative to the input vibration phase. Accordingly, this type of mounting structure is capable of exhibiting spring characteristics adapted to different characteristics of vibrations in the same frequency range, which occur as on a transverse F—F vehicle, depending upon the conditions of the vehicle.

Although the electrically controlled mounting structure with drive means discussed above is excellent in the operating principle itself, it is difficult to adjust its vibration damping and isolating capacity of the movable member, since the oscillation or reciprocation stroke of the movable member is constant or fixed. The capacity of the movable member is determined by a sum of the oscillation stroke and a pressure-receiving surface area of the movable member. Since both of these parameters are fixed in the conventional arrangement, the damping and isolating capacity due to the oscillation of the movable member is fixed.

Another drawback of the conventional electrically controlled mounting structure is associated with the arrangement of the drive means for moving the movable member. More particularly, the movable member consists of a substantially circular plate of a magnetic material, while the drive means employs electromagnet means energized for attracting the disc-like movable member by a magnetic force, and thereby reciprocating the movable member. According to this arrangement, the movable member cannot be smoothly oscillated at a high frequency, or the oscillation of the movable member upon energization of the drive means at a high frequency cannot follow high-frequency vibrations received by the mounting structure. This means insufficient capability of the movable member for high-frequency vibrations. Further, the movable member used in the conventional arrangement suffers from uneven distribution of the magnetic force produced by the drive means, which leads to local variations in the force of attracting the movable member, and consequently results in partial attraction of the movable member. This may also cause reduced ability of the movable member to follow high-frequency vibrations, and therefore the conventional electrically controlled mounting structure is not satisfactory in terms of its capability to deal with the high-frequency vibrations, which may cause booming noises, as encounterd on the F—F vehicle of the transverse-engine type.

SUMMARY OF THE INVENTION

It is accordingly an object of the present invention to provide an electrically controlled mounting structure disposed between a body and a power unit of a vehicle, wherein the movable member can be oscillated over a controlled operating stroke, and at a relatively high frequency.

According to the present invention, there is provided a mounting structure disposed between a body and a power unit of a vehicle for mounting of the power unit on the body, so as to effect vibration damping and isolation under the control of a control device, comprising: (a) an elastic body disposed between the body and the power unit of the vehicle; (b) means for defining a pressure-receiving chamber, in cooperating with the elastic body, the pressure-receiving chamber being filled with tan incompressible fluid through which the pressure-receiving chamber is subject to vibrations to be damped or isolated; (c) means for defining an equilibrium chamber which is filled with the incompressible fluid, and which communicates with the pressure-receiving chamber, so as to permit a change in a volume of the pressure-receiving chamber; (d) a movable member disposed between the pressure-receiving chamber and the equilibrium chamber, and functioning as parts of the means for defining the pressure-receiving and equilibrium chambers, the movable member being movable over a predetermined maximum distance in opposite directions parallel to a direction in which the mounting structure receives the vibrations; (e) elastic holder means for flexibly supporting the movable member such that the movable member is movable in the opposite directions; (f) guide means for guiding the movable member in the opposite directions; and (g) drive means connected to the control device, for reciprocating the movable member in the opposite directions along the guide means, over a controlled operating stroke and at a controlled frequency.

In the mounting structure of the present invention constructed as described above, the movable member disposed between the pressure-receiving chamber and the equilibrium chamber can be positively reciprocated or oscillated by the drive means. Thus, the present mounting structure is capable of exhibiting different or opposite spring characteristics, by controlling the drive means, depending upon the specific conditions of the vehicle.

Further, since the movable member is guided by the guide means in the direction of input of the vibrations, the movable member can stably and smoothly oscillated even at a high frequency. Namely, the movable member can follow the high-frequency vibrations.

Where the present electrically controlled mounting structure is used for a transverse F—F vehicle, the arrangement described above demonstrates substantially the same spring characteristics as the conventional arrangement, for low-frequency vibrations such as engine-idling vibrations and engine shakes. For high-frequency vibrations that cause undersirable booming noise, the present arrangement is more effective than the conventional counterpart.

Moreover, the oscillating stroke of the movable member can be varied by adjusting the level of voltage (amount of current) supplied to the drive means from the control device. More specifically, since the movable member is flexibly supported by the elastic holder means, the reciprocating stroke of the movable member is determined by a force produced by the drive means to move the movable member, relative to an elastic force of the elastic holder means supporting the movable member. In other words, the reciprocating stroke of the movable member is determined by the drive force to move the movable member against the elastic force of the elastic holder means, which is elastically yieldable when it is forced by the movable member. Thus, the operating stroke of the movable member can be changed by adjusting the power supplied to the drive means. According to this arrangement, the vibration absorbing capacity of the movable member can be readily adjusted, in dependence upon the vibrating conditions of the vehicle, or characteristics of the input vibrations.

According to one feature of the invention, the movable member comprises a magnetic portion made of a magnetic material, and the drive means comprises elecromagnet means controlled by the control device to move the movable member.

According to one form of the above feature of the invention, the electromagnet means comprises a first and a second annular solenoid which are disposed concentrically with each other, and which are energizable independently of each other. The guide means consists of a cylindrical member disposed within the first and second annular solenoids. The cylindrical member slidably accommodates the movable member so that the movable member is reciprocated by alternate energization of the first and second annular solenoids. The wall thickness of the cylindrical member is preferably held within a range of about 0.1–1.0 mm.

According to another feature of the invention, the guide member is formed from a single-layered film or a multi-layered laminar film, which is made of a resin selected from the group consisting of polyester, polyacetal, polyphenylene sulfide and polyamide. Since these resin materials have sufficiently low coefficient of friction, the oscillation of the movable member at a high frequency can be accomplished with improved stability.

According to a further feature of the invention, the mounting structure further comprises means for defining an orifice through which the pressure-receiving chamber and the equilibrium chamber communicate with each other. The orifice is formed so as to provide a predetermined resistance to a flow of the incompressible fluid therethrough between the pressure-receiving and equilibrium chambers.

According to a still further feature of the invention, the means for defining an equilibrium chamber comprises an elastic diaphragm which is deformable, thereby permitting a change in the volume of the equilibrium chamber and therefore a change in the volume of the pressure-receiving chamber.

According to a yet further feature of the invention, the elastic holder means comprises a pair of generally planar elastic members fixed to opposite ends of the movable member. In this case, the pair of planar elastic members may consist of a pair of rubber discs each of which has a central portion fixed to corresponding one of the opposite ends of the movable member, such that the central portion of the each rubber disc is elastically yieldable upon reciprocation of the movable member. The controlled operating stroke of the movable member is changed with an amount of yielding of the central portion of the each rubber disc, which varies with a drive force produced by the drive means.

In one form of the above feature of the invention, the movable member comprises a magnetic portion, and the drive means comprises a pair of electromagnets which are energized alternately by the control means, for reciprocating the movable member. The controlled operating stroke of the movable member is changed with an amount of electric power supplied to the pair of electromagnets.

In accordacne with another aspect of the present invention, there is provided an electrically controlled mounting system including a mounting structure disposed between a body and a power unit of a vehicle for mounting of the power unit on the body, so as to effect vibration damping and isolation, comprising: (a) a housing assembly; (b) an elastic body supported by the housing assembly and connected to one of the body and the power unit of the vehicle, the elastic body cooperating with the housing assembly to partially define a pressure-receiving chamber filled with an incompressible fluid which cooperates with the elastic member to receive vibrations to be damped or isolated; (c) an elastic diaphragm member supported by the housing assembly and partially defining an equilibrium chamber which is filled with the incompressible fluid, and which communicates with the pressure-receiving chamber, the elastic diaphragm member being elastically yieldable, so as to permit a change in a volume of the equilibrium chamber and thereby permit a change in a volume of the pressure-receiving chamber; (d) a movable member disposed between the pressure-receiving chamber and the equilibrium chamber, so that the movable member is movable over a predetermined maximum distance in opposite directions toward and away from the elastic body and the elastic diaphragm member; (e) elastic holder means supported by the housing assembly, for flexibly supporting the movable member so as to permit the movable member to be moved in the opposite directions; (f) drive means disposed within the housing assembly, between the pressure-receiving and equilibrium chamber, for reciprocating the movable member in the opposite directions; and (f) a control device connected to the drive means, for controlling the drive means so as to reciprocate the movable member over a controlled operating stroke being determined by an elasticity of the elastic holder means and a drive force produced by the drive means.

BRIEF DESCRIPTION OF THE DRAWINGS

The above and optional objects, features and advantages of the present invention will be better understood by reading the following detailed description of preferred embodiments of the invention, when considered in connection with the accompanying drawings, in which.

DETAILED DESCRIPTION OF THE PREFERRED EMBODIMENTS

Figure 1:
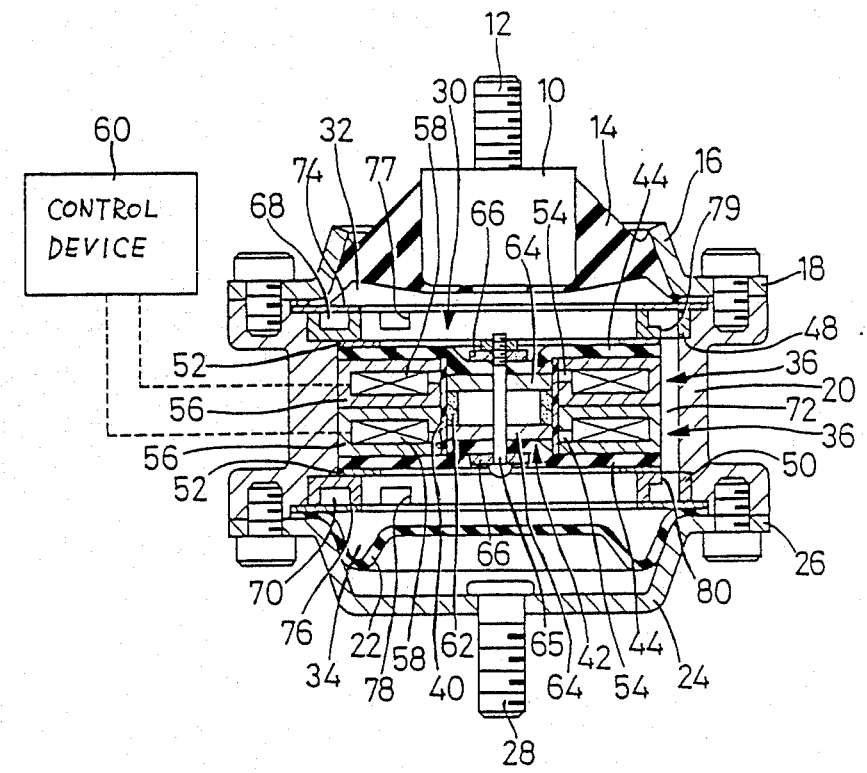
FIG. 1 is an elevational view in cross section of one embodiment of a mounting structure of the invention, as connected to a control device.

Referring first to FIG. 1, there is shown an electrically controlled mounting system including a preferred form of a mounting structure embodying the present invention. In the figure, reference numeral 10 designates a metallic mounting member disposed in an upper end of the mounting structure. The mounting member 10 is formed with an externally threaded portion 12 which extends upwards for connection to a power unit of a motor vehicle including an engine. The mounting member 10 is embedded in an elastic body in the form of a generally annular rubber block 14 having a generally truncated cross sectional shape. The rubber block 14 is secured at its outer surface to an annular upper bracket 16. Thus, the rubber block 14 is integrally secured to the mounting member 10 and the upper bracket 16, during a vulcanization process, so that the mounting member 10 is elastically connected to the upper bracket 16 via the rubber block 14.

The upper bracket 16 is formed with an outer flange portion 18 which is bolted to an upper end of a cylindrical main housing body 20 of the mounting structure, such that a thin-walled outer peripheral portion of the rubber block 14 is held between the flange portion 18 and the upper end of the main housing body 20. Thus, the upper opening of the main housing body 20 is fluid-tightly closed by the rubber block 14.

On the other hand, a lower opening of the main housing body 20 is fluid-tightly closed by an elastic diaphragm 22, whose outer peripheral portion is held between the lower end of the housing body 20 and an outer flange portion 16 of a lower bracket 14 bolted to the lower end of the housing body 20. The diaphragm 22 is made of a rubber material. The upper and lower brackets 16, 24 cooperate with the main housing body 20, to form a housing assembly of the mounting structure. This housing assembly cooperates with the elastic body or rubber block 14 and the elastic diaphragm 22, to define a fluid-tight enclosure or space.

The lower bracket 24 is a generally pan-shaped metal member which has a bolt 28 fixed to a central portion of its bottom wall. The bolt 28 extends downwardly from the bottom wall, for connection to a member of the vehicle body. In the present embodiment, therefore, the mounting structure is installed for mounting the power unit on the vehicle body, such that the threaded portion 12 of the mounting member 10 is fixed to the power unit, while the bolt 28 secured to the lower bracket 24 is fixed to the vehicle body.

The housing assembly accommodates a partition mechanism 30 in an axially intermediate portion of the main housing body 20, such that the partition mechanism 30 fluid-tightly divides the above-indicated fluid-tight space into an upper and a lower section. Namely, the elastic block 14, main housing body 20 and partition mechanism 30 define an upper, pressure-receiving chamber 32, while the elastic diaphragm 22, main housing body 20 and partition mechanism 30 define a lower, equilibrium chamber 34. These pressure-receiving and equilibrium chambers 32, 34 are filled with an incompressible fluid, such as water, alkylene glycols, polyaklylene glycols, silicone oil, low molecular weight polymers, or a suitable mixture thereof.

The partition mechanism 30 disposed between the paressure-receiving chamber 32 and the equilibrium chamber 34 includes: electromagnet means in the form of a pair of annular solenoids 36, 36 (first and second solenoids); guide means in the form of a cylndrical guide member 40 disposed within the solenoids 36, 36; a movable member 42 slidably received within the cylindrical member; and elastic holder means in the form of a pair of rubber discs 44, 44 which are disposed in contact with respective opposite ends of the electromagnet means 36, 36, and are secured to respective opposite ends of the movable member 42. More specifically described, the first and second annular solenoids 36, 36 are superposed on each other in concentric relation, such that their outer circumferential surfaces are held in contact with the inner circumferential surface of the main housing body 20. The cylindrical guide member 40 is a thin-walled liner made of a low-friction material. This liner 40 is fitted in the assembly of the annular solenoids 36, 36. The movable member 42 is a hollow cylindrical member diposed within the cylindrical guide member 40 with a very small clearance (preferably, about 0.01–0.1 mm) therebetween, such that the movable member 42 is slidably movable within the guide member 40 in opposite directions toward and away from the chambers 32, 34. Each of the rubber discs 44, 44 contacting the opposite axial end faces of the solenoid assembly 36, 36 has a relatively small thickness, and includes a central portion secured to the corresponding end of the movable member (the end as viewed in the direction of movement). The rubber discs 44, 44 are also held in contact with the inner circumferential surface of the main housing body 20, and their peripheral portions are forced against the solenoids 36, 36 in the axial directions by a corresponding pair of annular orifice members 48, 50, via a pair of annular retrainers 52, 52. Thus, the rubber discs 44, 44 of the partition mechanism 30 fluid-tightly separate the pressure-receiving and equilibrium chambers 32, 34 from each other. The orifice members 48, 50 are held in place by the main housing body 20 and the upper and lower brackets 16, 24.

Each of the two solenoids 36, 36 consists of an annular yoke member 56 having an annular space therein, and a coil 58 accommodated in the annular space of the yoke member 56. The annular yoke member 56 has a rectangular cross sectional shape as seen in FIG. 1, with the long sides of the rectangle extending in the radial direction of the cylindrical main housing body 20. The yoke members 56, 56 have respective annular openings 54, 54 formed in their inner circumferential walls. These annular openings 54, 54 are located at symmetrical points on the short sides of the cross sectional rectangles of the yoke members 56, 56, which points are positioned nearer to the end faces of the yoke members 56, 56 contacting the rubber discs 44, 44, than to the interface between the yoke members 56, 56. The solenoid coils 58, 58 are connected to an external control device 60 so that the two coils 58, 58 are energized independently of each other. The cylindrical guide member 40 in pressed contact with the solenoids 36, 36 is generally made of a resin such as polyester, polyacetal, polyphenylene sulfide or polyamide. The guide member 40 is obtained by forming a prepared single-layered or multi-layered laminar film of such a resin material having a thickness of about 01.-1.0 mm, into a cylindrical form. alternatively, a 0.1-1.0 mm thick cylindrical film is directly formed of the selected material, to prepare the guide member.

The movable member 42 consists of a cylindrical non-magnetic spacer 62 made of a non-magnetic material such as aluminum, and a pair of magnetic discs 64, 64 which are made of a ferromagnetic material such as iron. The spacer 62 has a length which is shorter by a suitable distance than a distance between the two annular openings 54, 54 formed in the yoke members 55, 56. The magnetic discs 64, 64 are disposed at opposite ends of the spacer 62. A bolt 65 extends through the central portions of the rubber discs 44, 44, and through the central portions of the magnetic discs 64, 64 of the movable member 42. The bolt 65 is tightened by a nut through two non-magnetic washers 66, 66 resting on the outer surfaces of the rubber discs 44, 44. Thus, the magnetic discs 64, 64 are forced against the opposite ends of the non-magnetic spacer 62, and the central portions of the rubber discs 44, 44 are forced against the corresponding magnetic discs 64, 64 of the movable member 42. With the bolt 65 properly tightened, the rubber discs 44, 44 are displaced by a suitable amount at their central portions toward each other. In this way, the movable member 42 is flexibly supported by the elastic holder means in the form of the pair of rubber discs 44, 44.

In operation, the solenoid coils 58, 58 are alternately energized by the control device 60, so that the movable member 42 is positively reciprocated or oscillated by magnetic attractive forces produced by the energized coils 58, 58, over a controlled operating stroke in the axial direction of the cylindrical main housing body 20, that is, in opposite directions parallel to a direction in which vibrations are applied to the mounting structure. The maximum operating stroke of the movable member 42 is determined by the distance between the annular openings 54, 54 of the solenoids 36, 36, and the distance between the magnetic discs 64, 64 of the movable member 42. As described in greater detail, the operating stroke of the movable member 42 is varied with a level of voltages applied to the solenoid coils 58, 58.

The pressure-receiving chamber 32 and the equilibrium chamber 34 which are fluid-tightly separated from each other, are held in communication with each other through an orifice means which is constituted by annular passages 68, 70 formed in the orifice members 48, 50, respectively, and an axial passage 72 formed in the inner wall portion of the main housing body 20.

Described in more detail, the annular passages 68, 70 of the orifice are formed such that annular grooves formed in the orifice members 48, 50 are closed by respective annular closure members 74, 76, which are disposed between the orifice members 48, 50, and the upper and lower brackets 16, 24. The orifice members 48, 50 further have communication ports 77, 78 formed therein. The communication port 77 communicates with the annular passage 68 and the pressure-receiving chamber 32, while the communication port 78 communicates with the annular passage 70 and the equilibrium chamber 34. Thus the annular passages 68, 70 communicate with the corresponding chambers 32, 34. On the other hand, the axial passage 72 is formed such that an axial groove formed in the inner circumferential surface of the main housing body 20 is closed by the outer circumferential surface of the partition mechansim 30. The axial passage 72 is connected at its opposite ends to the annular passages 68, 70, respectively, via respective communication ports 79, 80 also formed in the orifice members 48, 50.

In the mounting structure constructed as described above, the movable member 42 is positively oscillated or reciprocated in the direction of input of vibrations to the mounting structure (in the direction in which the pressure-receiving and equilibrium chambers are disposed on the opposite sides of the partition mechanism 30), by magnetic attracting forces produced by the solenoids 36, 36 by alternate energization of the two coils 58, 58 under the control of the control device 60. The reciprocation frequency and stroke of the movable member 42, and the reciprocation phase thereof relative to the input vibrations, are controlled by regulating the energization currents applied to the coils 58, 58.

Stated more particularly, the movable member 42 of the present mounting structure is reciprocated or oscillated at a frequency substantially equal to the frequency of the vibrations applied to the pressure-receiving chamber 32, as in a conventional electrically controlled mounting system. Further, the present mounting structure is adapted to exhibit high dynamic spring constant and damping coefficient, when the reciprocation phase of the movable member 42 (i.e., energization phase of the coils 58, 58) is advanced within a range of 0-90 degrees relative to the frequency of the input vibrations. Conversely, the mounting structure may exhibit low dynamic spring constant and damping coefficient, if the reciprocation phase of the movable member 42 is retarded within a range of 90-180 degrees relative to the frequency of the input vibrations. In this manner, the instant mounting structure can be controlled by the control device 60, so as to exhibit reversible vibration damping and isolating characteristics. Accordingly, if the instant electrically controlled mounting system is used for a F—F (front-engine, front-drive) vehicle equipped with a transversly oriented engine (perpendicular to the longitudinal centerline of the vehicle), the mounting structure is capable of excellently dealing with different or opposite behaviors or characteristics of input vibrations of substantially the same frequency range, depending upon the specific conditions of the vehicle. Namely, the mounting structure provides effective damping and isolating capabilities for not only the idling vibrations while the vehicle is at rest with the engine in an idling condition, but also the engine shaking vibrations (including vehicle-start vibrations) while the vehicle is started. The operating conditions of the movable member 42 are determined by the control device 60 according to a predetermined program, depending upon the vehicle operating conditions and the characteristics of the input vibrations, which are monitored by various sensors such as a vehicle-speed sensor, an acceleration sensor (e.g., a sensor which detects the engine throttle angle), an engine-rpm sensor, a shift-position sensor (a sensor adapted to detect the selected position of the transmission shift lever), and sensors for detecting displacements of selected members of the vehicle.

An important feature of the present mounting structure lies in the use of the elastic holder means 44, 44 for the movable member 42. That is, the movable member 42 is flexibly supported by the pair of rubber discs 44, 44 such that the central portions of the discs are secured to the opposite ends of the movable member 42. In this arrangement, the movable member 42 is reciprocated by the magnetic forces produced by the alternately activated solenoids 36, 36, against elastic forces of the rubber discs 44, 44, or such that the movable member 42 attracted by the solenoids 36, 36 is moved while causing the rubber discs 44, 44 to be elastically deformed. Hence, the reciprocation stroke or the oscillation amplitude of the movable member 42 is determined by the magnetic forces produced by the solenoids 36, 36, relative to the elastic forces of the rubber discs 44, 44 which resist the movements of the movable member 42. Accordingly, the reciprocation stroke of the movable member 42 is determined by the amount of electric current applied to the solenoids 36, 36. In other words, the spring characteristics of the mounting structure can be changed by adjusting the electric current applied to the solenoids 36, 36.

Figure 2:
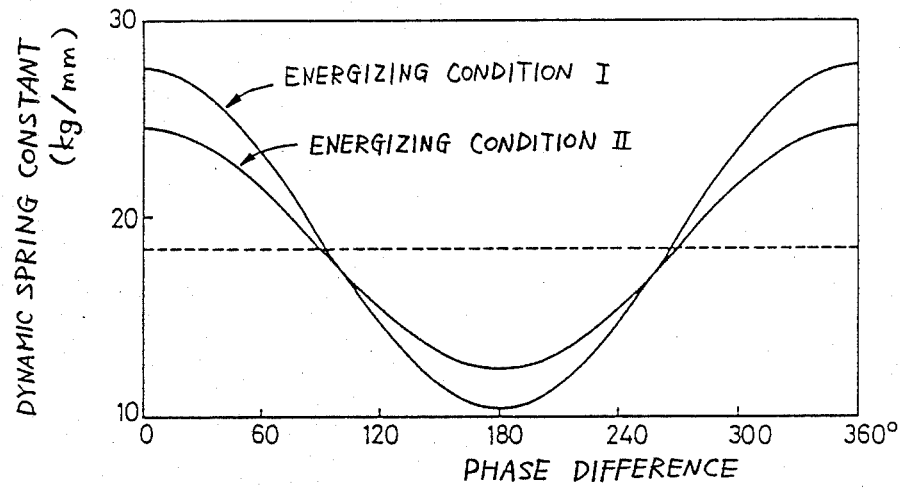
FIGS. 2 and 3 are graphs showing relations between a dynamic spring constant of the mounting structure of FIG. 1, and a phase difference between input vibrations and reciprocation of a movable member, FIG. 2 representing changes in the spring characteristics of the mounting device with a level of voltages applied to drive means for reciprocating the movable member, and FIG. 3 showing that the mounting structure exhibits excellent spring characteristics even when the movable member is operated at a high frequency.

Referring to FIG. 2, there are shown two different curves which represent relations between a variation in the dynamic spring rate or constant (Kd) of the mounting structure, and a phase difference between the input vibrations applied to the pressure-receiving chamber 32, and the oscillation of the movable member 42 (alternate energization cycle of the solenoids 36, 36). These two curves (indicated in solid lines) were obtained by changing the level of voltage (amount of current) alternately applied to the solenoids 36, 36 (coils 58, 58) for reciprocating or oscillating the movable member 42. The solenoids 36, 36 were energized at a frequency of 10 Hz. The other operating conditions of the solenoids 36, 36 were indicated in Table 2, together with the reciprocation strokes of the movable member 42 obtained in the specified conditions. Dashed line in FIG. 2 indicates a dynamic spring constant (Kd) of the mounting structure obtained if the movable member 42 is held fixed in position.

TABLE 2

| Energizing Condition | I | II |
|---|---|---|
| Energization Voltage (V) | 12 | 10 |
| Duty Cycle | 1/1 | 1/1 |
| Reciprocation Stroke (mm) | 1.3 | 1.1 |

As is apparent from FIG. 2 and Table 2, the reciprocation stroke and consequently the vibration absorbing capacity of the movable member 42 can be changed by adjusting the energizing conditions (i.e., energization voltage) of the solenoid assembly 36, 36 (coils 58, 58). Further, it will be readily understood that the dynamic spring constant of the mounting structure is varied with the oscillating phase of the movable member 42.

A further advantage of the present mounting structure accrues from the use of the guide means 40 for the movable member 42. More specifically, the movable member 42 which is movable in the direction of input of vibrations is slidably guided within and by the cylindrical guide member or liner 40 which is made of a low-friction material. This arragement contributes to stable and smooth reciprocating actions of the movable member 42, even if the solenoids 36, 36 are energized at a relatively high frequency. This means that the movable member 42 is able to be oscillated more exactly following the vibrations of a high frequency range, than the movable member used in the conventional mounting structure. Thus, the present mounting structure provides improved spring characteristics for dealing with booming noises which occur due to vibrations of a relatively high frequency range. The conventional arrangement fails to deal with such booming noises, which tend to be generated on the transverse F—F vehicle indicated above.

Figure 3:
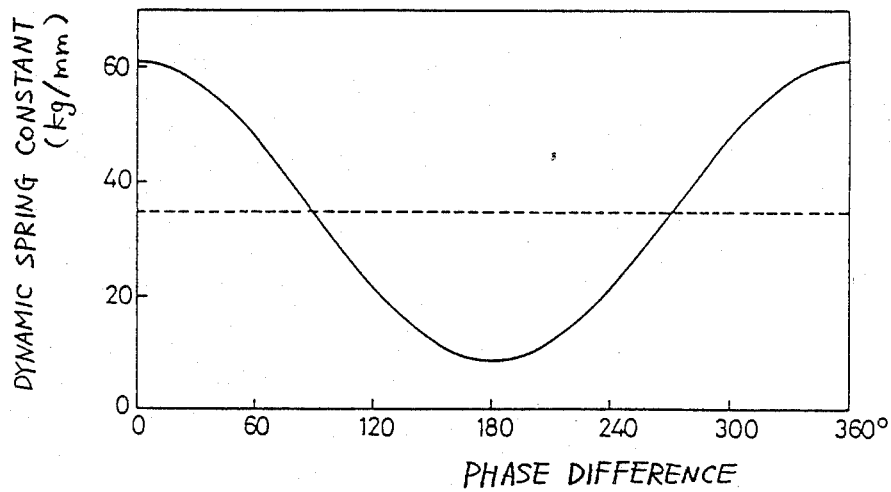
Figure 5:
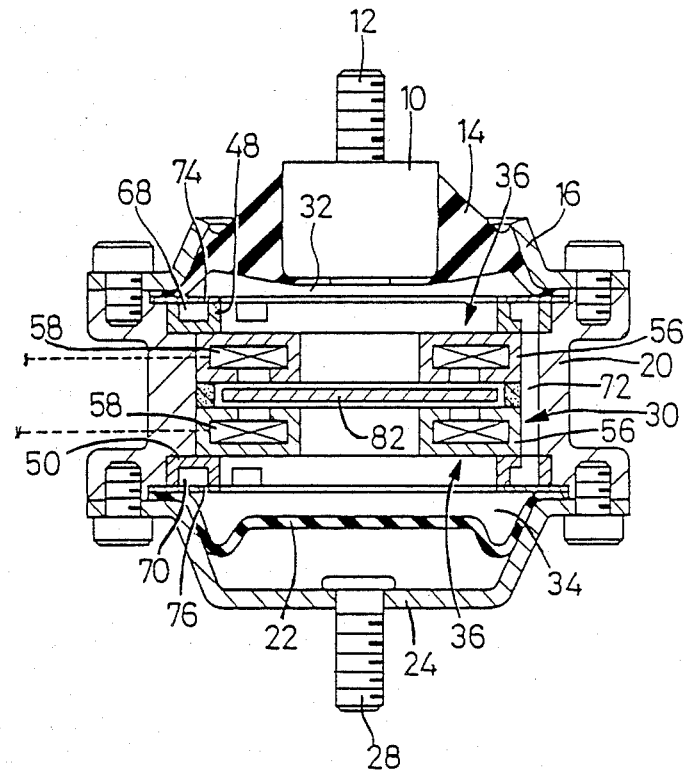
FIG. 5 is a view corresponding to that of FIG. 1, illustrating an example of a conventional mounting structure.

Referring to FIG. 3, there is illustrated in solid line a dynamic spring constant-phase difference curve similar to those shown in FIG. 2, which was obtained when the solenoid assembly 36, 36 (coil assembly 58, 58) was energized at a frequency of 100 Hz. As is apparent from the graph, the present mounting structure exhibits excellent spring characteristics even for high-frequency vibrations. Dashed line in FIG. 3 also indicates a dynamic spring constant (Kd) of the mounting structure when the movable member 42 is held fixed in position. The curve shown in FIG. 3 was obtained with the solenoid energization voltage of 10 V and duty cycle of 1/1. The reciprocation stroke of the movable member 42 was 0.6 mm. The same energization conditions were applied to a conventional mounting structure as shown in FIG. 5, which has substantially the same size as the present mounting structure, and which employs a ferromagnetic movable member 82 that is not flexibly supported by elastic holder means. In this comparative test, the movable member 82 was not reciprocated at the 100 Hz frequency of energization of the solenoids 36, 36.

A still further advantage of the present mounting structure is derived from the use of the rubber discs 44, 44 for flexibly supporting the movable member 42 in the present embodiment. That is, the movements of the movable member 42 are regulated by a relation between the magnetic attracting forces of the solenoids 36, 36 and the elastic forces of the rubber discs 44, 44. This construction is effective to avoid patting noises which are produced in the conventional mounting structure (as shown in FIG. 5) due to collision of the movable member against relatively rigid metallic members which determine or limit the ends of a reciprocating or oscillating movement of the movable member.

Figure 4:
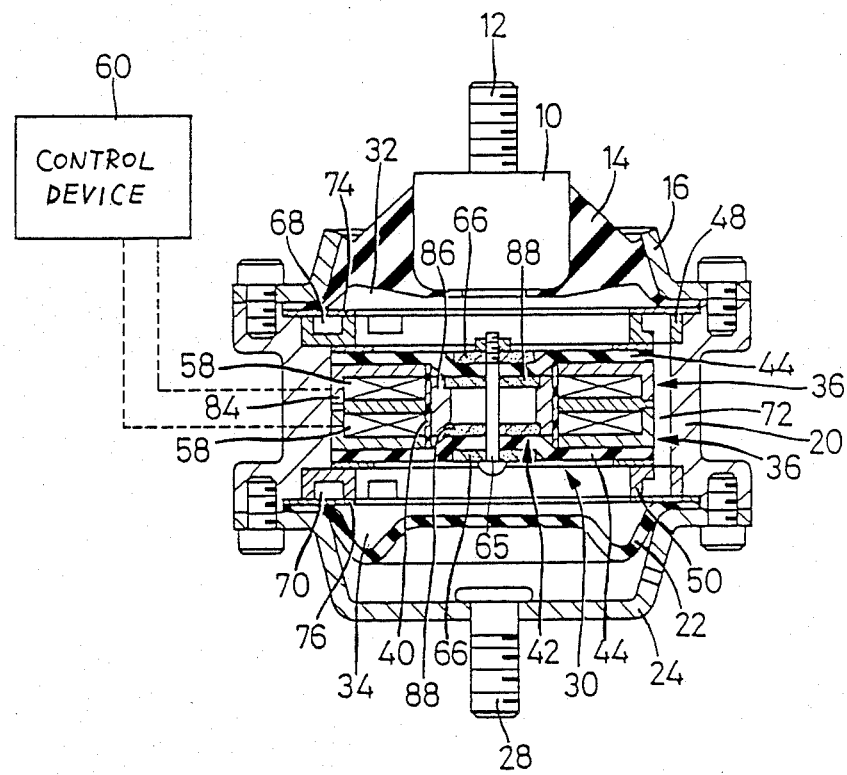
FIG. 4 is an elevational view corresponding to that of FIG. 1, showing another embodiment of the invention.

Referring next to FIG. 4, there is shown a modified embodiment of the present invention. In the interest of brevity and simplification, the same reference numerals as used in FIG. 1 will be used in FIG. 4, to identify the corresponding elements. It will be seen from FIG. 4, that the present modified mounting structure is different from the preceding embodiment, only in the arrangement of the solenoid assembly 36, 36 and the movable member 42.

Described in more detail referring to FIG. 4 the solenoid assembly 36, 36 uses a single annular yoke member 84 which has a cross sectional shape similar to letter "E" having openings on the inner circumference to the annulus. The two coils 58, 58 are accommodated in the respective spaces of the E-shaped yoke member 84. The cylindrical guide member 40 is held in contact with the inner circumference of the thus constructed solenoid assembly 36, 36.

The movable member 42 used in the present embodiment consists of a magnetic cylindrical member 86 made of a ferromagnetic material, and a pair of non-magnetic discs 88, 88 made of a non-magnetic material. As in the preceding embodiment, the movable member 42 is flexibly supported to the rubber discs 44, 44 by the bolt 65 extending through the movable member 42 and the rubber discs 44, 44. The movable member 42 is fitted in the cylindrical guide member 40, with a very small clearance between the outer surface of the magnetic cylindrical member 86 and the inner surface of the cylindrical guide member 40. The coils 58, 58 are electrically connected to the control device 60, so that the movable member 42 is reciprocated in the direction of input of the vibrations, upon alternate energization of the two coils 58, 58. In the present mounting structure, the maximum operating stroke of the movable member 42 is determined by a thickness (dimension in the axial direction of the cylindrical main housing body 20) of the yoke member 84, and a length of the magnetic cylindrical member 86. As indicated in the figure, the present mounting structure also has an orifice for restricted fluid communication between the pressure-receiving chamber 32 and the equilibrium chamber 34.

The modified mounting structure described above also enjoys substantially the same advantages as discussed in connection with the preceding embodiment of FIG. 1.

Although the illustrated embodiments are adapted such that the pressure-receiving and equilibrium chambers 32, 34 communicate with each other through an orifice, for an improved vibration damping effect due to a restricted flow of the incompressible fluid through the orifice, it is not essential to provide such an orifice for practicing the present invention.

In the illustrated embodiments, a flexible or elastic film in the form of the rubber diaphragm 22 is used to partially define the equilibrium chamber 34 separated from the pressure-receiving chamber 32 by the partition mechanism 30, so that the elastic deformation of the diaphragm 22 permits a change in the volume of the pressure-receiving chamber 32. However, the principle of the present invention does not require that such an elastic film be used for the equilibrium chamber 34. For instance, the equilibrium chamber may be formed by closing the lower opening of the cylindrical main housing body 20 with a rubber block similar to the rubber block 14. In this case, it is possible that the mounting member 10 on the side of the pressure-receiving chamber 32, and a similar mounting member on the side of the equilibrium chamber are connected to each other by a suitable connecting member for attached to one of the power unit and the body of the vehicle, while the main housing body 20 is attached to the other of the power unit and vehicle body.

While the electrically controlled mounting strcuture according to the present invention is suitably used for mounting a power unit on a F—F vehicle with a tranversely oriented engine, the concept of the invention is equally applicable to the installation of a power unit on other types of vehicle.

While the present invention has been described in its preferred embodiments, it is to be understood that the invention is by no means confined to the precise details of the illustrated embodiments, but various changes, alterations, modifications and improvements may be made in the invention, without departing from the spirit and scope of the invention defined in the appended claims.

What is claimed is:

1. A mounting structure disposed between a body and a power unit of a vehicle for mounting of the power unit on the body, so as to effect vibration damping and isolation under the control of a control device, comprising:

an elastic body disposed between said body and said power unit of the vehicle;

means for defining a pressure-receiving chamber, in cooperation with said elastic body, said pressure-receiving chamber being filled with an incompressible fluid through which the pressure-receiving chamber is subject to vibrations to be damped or isolated;

means for defining an equilibrium chamber which is filled with said imcompressible fluid, and which communicates with said pressure-receiving chamber through passage means, so as to permit a change in a volume of said pressure-receiving chamber;

a movable member disposed between said pressure-receiving chamber and said equilibrium chamber, and functioning as parts of said means for defining said pressure-receiving and equilibrium chambers, said movable member being movable over a predetermined maximum distance in opposite directions parallel to a direction in which the mounting structure receives said vibrations;

elastic holder means comprising a pair of generally planar elastic members fixed to opposite ends of said movable member for flexibly supporting said movable member such that said movable member is movable in said opposite directions;

guide means for guiding said movable member in said opposite direction in a sliding contact manner; and drive means connected to said control device, for reciprocating said movable member in said opposite directions along said guide means, over a controlled operating stroke and at a controlled frequency.

2. A mounting structure according to claim 1, wherein said movable member comprises a magnetic portion made of a magnetic material, and said drive means comprises electromagnet means controlled by said control device to move said movable member.

3. A mounting structure according to claim 2, wherein said electromagnet means comprises a first and a second annular solenoid which are disposed concentrically with each other, and which are energizable independently of each other, said guide means consisting of a cylindrical member disposed within said first and second annular solenoids, said cylindrical member slidably accommodating said movable member so that said movable member is reciprocated by alternate energization of said first and second annular solenoids.

4. A mounting structure according to claim 3, wherein said cylindrical member has a wall thickness of 0.1-1.0 mm.

5. A mounting structure according to claim 1, wherein said guide member is formed from one of a single-layered film and a multi-layered laminar film each of which is made of a resin selected from the group consisting of polyester, polyacetal, polyphenylene sulfide and polyamide.

6. A mounting structure according to claim 1, wherein said guide member consists of a cylindrical member formed of a resin selected from the group consisting of polyester, polyacetal, polyphenylene sulfide and polyamide.

7. A mounting structure according to claim 1, further comprising means for defining an orifice through which said pressure-receiving chamber and said equilibrium chamber communicate with each other, said orifice providing a predetermined resistance to a flow of said incompressible fluid therethrough between said pressure-receiving and equilibrium chambers.

8. A mounting structure according to claim 1, wherein said means for defining an equilibrium chamber comprises an elastic diaphragm which is deformable, thereby permitting said change in the volume of the pressure-receiving chamber.

9. A mounting structure according to claim 1, wherein said pair of generally planar elastic members consist of a pair of rubber discs each of which has a central portion fixed to a corresponding one of said opposite ends of said movable member, such that said central portion of said each rubber disc is elastically yieldable upon reciprocation of said movable member, said controlled operating stroke of said movable member being changed with an amount of yielding of said central portion of said each rubber disc which varies with a drive force produced by said drive means.

10. A mounting structure according to claim 9, wherein said movable member comprises a magnetic portion, and said drive means comprises a pair of electromagnets which are energized alternately by said control means, for reciprocating said movable member, said controlled operating stroke of said movable member being changed with an amount of electric power supplied to said pair of electromagnets.

11. An electrically controlled mounting system including a mounting structure disposed between a body and a power unit of a vehicle for mounting of said power unit on said body, so as to effect vibration damping and isolation, comprising:

a housing assembly;

an elastic body supported by said housing assembly and connected to one of said body and said power unit of the vehicle, said elastic body cooperating with said housing assembly to partially define a pressure-receiving chamber filled with an incompressible fluid which cooperates with said elastic member to receive vibrations to be damped or isolated;

an elastic diaphragm member supported by said housing assembly and partialy defining an equilibrium chamber which is filled said incompressible fluid, and which communicates with said pressure-receiving chamber through a passage means, said elastic diaphragm member being elastically yieldable, so as to permit a change in a volume of said equilibrium chamber and thereby permit a change in a volume of said pressure-receiving chamber;

a movable member disposed between said pressure-receiving chamber and said equilibrium chamber, so that said movable member is movable over a predetermined maximum distance in opposite directions toward and away from said elastic body and said elastic diaphragm member;

elastic holder means supported by said housing assembly and comprising a pair of generally planar elastic members fixed to opposite ends of said movable member, for flexibly supporting said movable member so as to permit said movable member to be moved in said opposite directions;

drive means disposed within said housing assembly, between said pressure-receiving and equilibrium chambers, for reciprocating said movable member in said opposite directions;

guide means for guiding said movable member in said opposite directions in a sliding contact manner; and a control device connected to said drive means, for controlling said drive means so as to reciprocate said movable member over a controlled operating stroke and at a controlled frequency, said controlled operating stroke being determined by an elasticity of said elastic holder means and a drive force produced by said drive means.

12. An electrically controlled mounting system according to claim 11, wherein said pair of generally planar elastic members consist of a pair of rubber discs which are secured to said opposite ends of said movable member, said rubber discs cooperating with said housing assembly, said elastic body and said elastic diaphragm member to define said pressure-receiving and equilibrium chambers.

13. An electrically controlled mounting system according to claim 11, further comprising means for defining an orifice through which said pressure-receiving chamber and said equilibrium chamber communicate with each other, said orifice providing a predetermined resistance to a flow of said incompressible fluid therethrough between said pressure-receiving and equilibrium chambers.

14. An electrically controlled mounting system according to claim 11, further comprising a guide member fixedly disposed within said housing assembly, for guiding said movable member in said opposite directions.

15. An electrically controlled mounting system according to claim 14, wherein said drive means comprises annular electromagnet means, and said guide member comprises a non-magnetic cylindrical member disposed within said annular electromagent means, said movable member having a magnetic portion and being slidably received within said cylindrical member.

16. An electrically controlled mounting system according to claim 11, wherein said housing assembly comprises a main housing assembly body having opposite open ends, a first bracket member secured to one of opposite open ends of said housing assembly, and a second bracket member secured to the other open end of said housing assembly, said elastic body being secured to said first bracket, while said elastic diaphragm member being supported by said second bracket member, said second bracket member being connected to the other of said body and said power unit of the vehicle.

* * * * *